(12) United States Patent
Li

(10) Patent No.: US 10,507,939 B2
(45) Date of Patent: Dec. 17, 2019

(54) NON-LEGGED REUSABLE AIR-LAUNCHED CARRIER ROCKET

(71) Applicant: Peng Li, Beijing (CN)

(72) Inventor: Peng Li, Beijing (CN)

( * ) Notice: Subject to any disclaimer, the term of this patent is extended or adjusted under 35 U.S.C. 154(b) by 0 days.

(21) Appl. No.: 16/152,449

(22) Filed: Oct. 5, 2018

(65) Prior Publication Data

US 2019/0039753 A1     Feb. 7, 2019

Related U.S. Application Data

(63) Continuation of application No. PCT/CN2017/087009, filed on Jun. 2, 2017.

(30) Foreign Application Priority Data

Jun. 14, 2016   (CN) .......................... 201610413162.7

(51) Int. Cl.
| | |
|---|---|
| *B64G 1/00* | (2006.01) |
| *B64D 7/08* | (2006.01) |
| *B64C 39/02* | (2006.01) |
| *B64G 1/40* | (2006.01) |

(52) U.S. Cl.
CPC .............. *B64G 1/005* (2013.01); *B64C 39/02* (2013.01); *B64D 7/08* (2013.01); *B64G 1/402* (2013.01)

(58) Field of Classification Search
CPC ........... B64G 1/005; B64G 1/402; B64D 7/08
See application file for complete search history.

(56) References Cited

U.S. PATENT DOCUMENTS

| | | | |
|---|---|---|---|
| 4,802,639 A * | 2/1989 | Hardy | B64C 37/02 244/137.4 |
| 5,402,965 A | 4/1995 | Cervisi et al. | |
| 5,667,167 A * | 9/1997 | Kistler | B64G 1/002 244/110 E |
| 6,454,216 B1 | 9/2002 | Kiselev et al. | |
| 6,616,092 B1 | 9/2003 | Barnes et al. | |
| 7,753,315 B2 * | 7/2010 | Troy | B64G 1/005 244/15 |

(Continued)

FOREIGN PATENT DOCUMENTS

| | | |
|---|---|---|
| CN | 101995193 A | 3/2011 |
| CN | 103025611 A | 4/2013 |
| CN | 103224028 A | 7/2013 |

(Continued)

*Primary Examiner* — Brian M O'Hara
(74) *Attorney, Agent, or Firm* — Wayne & Ken, LLC; Tony Hom

(57) ABSTRACT

Disclosed is a non-legged reusable air-launched carrier rocket mounted on a mid-line pylon of a supersonic fighter or a bomber fuselage and its length is not limited by the front undercarriage of the carrier aircraft. The rocket body has opposite upper and lower elongated openings at the position of the front undercarriage of the carrier aircraft. When running, the upper cover and lower cover of the openings open to the rocket body to form a vertical passage, so that the front undercarriage can be normally placed down. After taking off, the upper cover and lower cover close to form a cavity in the rocket body, and the cavity is then filled with liquid from the liquid tank in the carrier aircraft. The configuration is similar to the Roton carrier rocket.

1 Claim, 7 Drawing Sheets

(56) References Cited

U.S. PATENT DOCUMENTS 8,403,254 B2 * 3/2013 Ustinov ................... B64D 5/00
                                                                    244/158.9
10,106,273 B2 * 10/2018 Burgener ............... B64D 39/00

FOREIGN PATENT DOCUMENTS

| | | | |
|---|---|---|---|
| CN | 106043705 A | 10/2016 | |
| CN | 205819572 U | 12/2016 | |
| EP | 0778200 A2 * | 6/1997 | ............. B64G 1/005 |

* cited by examiner

NON-LEGGED REUSABLE AIR-LAUNCHED CARRIER ROCKET

CROSS-REFERENCE TO RELATED APPLICATIONS

This application is a continuation of International Application No. PCT/CN2017/087009 with a filing date of Jun. 2, 2017, designating the United States, now pending, and further claims priority to Chinese Application No. 201610413162.7 with a filing date of Jun. 14, 2016. The contents of the aforementioned applications, including any intervening amendments thereto, are incorporated herein by reference.

FIELD OF THE INVENTION

The present invention relates to an air-launched reusable carrier rocket mounted on a mid-line pylon of a supersonic fighter or bomber fuselage, and more particularly to a non-legged reusable air-launched carrier rocket of which the rocket head can be advanced to the front of the front undercarriage of the carrier aircraft.

BACKGROUND OF THE INVENTION

By using an active or retired supersonic fighter or bomber, the satellite carrier system is realized by mounting an air-launched carrier rocket on its mid-line pylon, without the need to separately develop a carrier aircraft, which is low in cost. The carrier rocket is separated supersonic at high altitude, which is high in performance. However, for the existing air-launched carrier rocket mounted on the mid-line pylon of the supersonic fighter or bomber fuselage, the head of the rocket body must be arranged behind the front undercarriage of the carrier aircraft, otherwise the front undercarriage of the carrier aircraft cannot be put down and thus the carrier aircraft could not normally take off. Such an air-launched carrier rocket is short in length, and has a small fuel load and a low carrying capacity. The reusable carrier rocket of the existing Roton configuration that is not disclosed in any corresponding patent adopts a long round table-shaped rocket body tapering upwards. Since the bottom of the rocket body is wide, the legs that are deployed when landing can be relatively small. However, this long round table shape is obviously not available for air-launched carrier rockets. If cylindrical rocket is otherwise adopted, in order to stand firm during landing, it is necessary to ensure that the expanded legs have a large width, only long and large legs can be used. But such legs have a lot of weight resistance. The load referred to in the following text means the satellite or satellite/upper stage combination. In addition, the Roton rocket is single-staged, and the load can be placed at the rear of the rocket. It is deployed into the track through a large-sized hatch. For a cylindrical air-launched rocket body, the diameter of the rear part is extremely limited and is not much larger than the diameter of the load and thus a large-sized hatch cannot be opened, so the load must be placed at the front end of the rocket. A problem arises that a load adapter tail would interfere with the rotor paddle pivot.

SUMMARY OF THE INVENTION

The first technical problem to be solved by the present invention is to prevent an extremely long rocket body from interfering with the retraction of the front undercarriage of the carrier aircraft. In order to solve the above technical problem, the rocket body described in the present invention has two elongated openings opposite to each other in the vertical direction positioned just below a front undercarriage of the carrier aircraft. A cover of the upper opening is opened downwards to the rocket body, and a cover of the lower opening is opened upwards to the rocket body. When the carrier aircraft with the rocket body is parking on the ground and is in normal take-off run, the upper cover and the lower cover are opened, so that the front undercarriage can be normally lowered. A vertical passage formed by the upper opening and the lower opening is supported on the ground. After the take-off run of the carrier aircraft, subsequent to retracting of the front undercarriage of the carrier aircraft, the upper cover is closed upwards and the lower cover is closed downwards, so that an outer surface of the rocket is streamliner and forms a cavity in the rocket body with rear walls of a storage tank of the rocket body. Then a liquid tank in the carrier body supplements fuel or oxidant or elemental propellant into the cavity formed in the rocket body by a pipe on a hanger through an exit on a rear wall of the storage tank of the rocket body, and then the full rocket body is placed to perform a carrying task. The air-launched carrier rocket of the present invention can be long and bulky, and has high carrying capacity. A large-volume air-launched carrier rocket can conditionally use a carrier rocket having an engine with higher specific impulse.

The second technical problem to be solved by the present invention is how to completely remove the legs. Because there is no leg, the bottom of the engine must be directly grounded, so it is impossible to use a bell-shaped nozzle that cannot be stressed. A plug nozzle must be used. To ensure that the plug nozzle is not damaged when it is dropped, a Stewart platform must be placed at the drop point to offer a cushioning effect otherwise provided by the legs. The shape of the bottom surface of the plug nozzle must match the surface of the stewart platform. If the bottom surface of the plug nozzle is a convex spherical surface, the surface of the stewart platform must be a concave spherical surface or both are planar surfaces. When the rocket returning from high altitude is briefly suspended above the Stewart platform under the action of the rotor, the Stewart platform is aligned with and touched the bottom surface of the plug nozzle under the control of the internal six-degree-of-freedom software to complete the task of bearing its weight. At the same time, the Stewart platform must have equipment that contacts the middle of the rocket body and holds the rocket body to prevent it from falling over. There are many devices that can play such a role, and they are all in the public knowledge category, and therefore do not belong to the content of the present application. For example, said equipment may be 4 movable robot arms arranged circumferentially, and so on.

A third technical problem to be solved by the present invention is how to prevent the tail of the load adapter from interfering with the rotor paddle pivot. The rotor paddle pivot is located at the central axis of the rocket body, and 2 or 4 or 6 short branch arms radially protrude from the paddle pivot to the edge of a circumferential section of the rocket body, and then 2 or 4 or 6 rotors are hinged at the end by flapping hinge. Therefore, the tail of the round table-shaped load adapter must have stack-shaped concave notches, and the number of the notches is equal to the number of rotors. Thus, the short branch arms can extend through the concave notches to the circumferential edge. When the load is separated from the load adapter, the load adapter and the rocket are also separated, and the rotor is free to rotate.

BRIEF DESCRIPTION OF THE DRAWINGS

The present invention will be further described in detail below in conjunction with the drawings and specific embodiments. Since the rotor of the rocket head is not what is claimed in the present invention and in order to avoid unnecessary obscuration and to keep it simple, the rotors are not shown in FIGS. 1-5.

DETAILED DESCRIPTION OF ILLUSTRATED EMBODIMENTS

Figure 1:
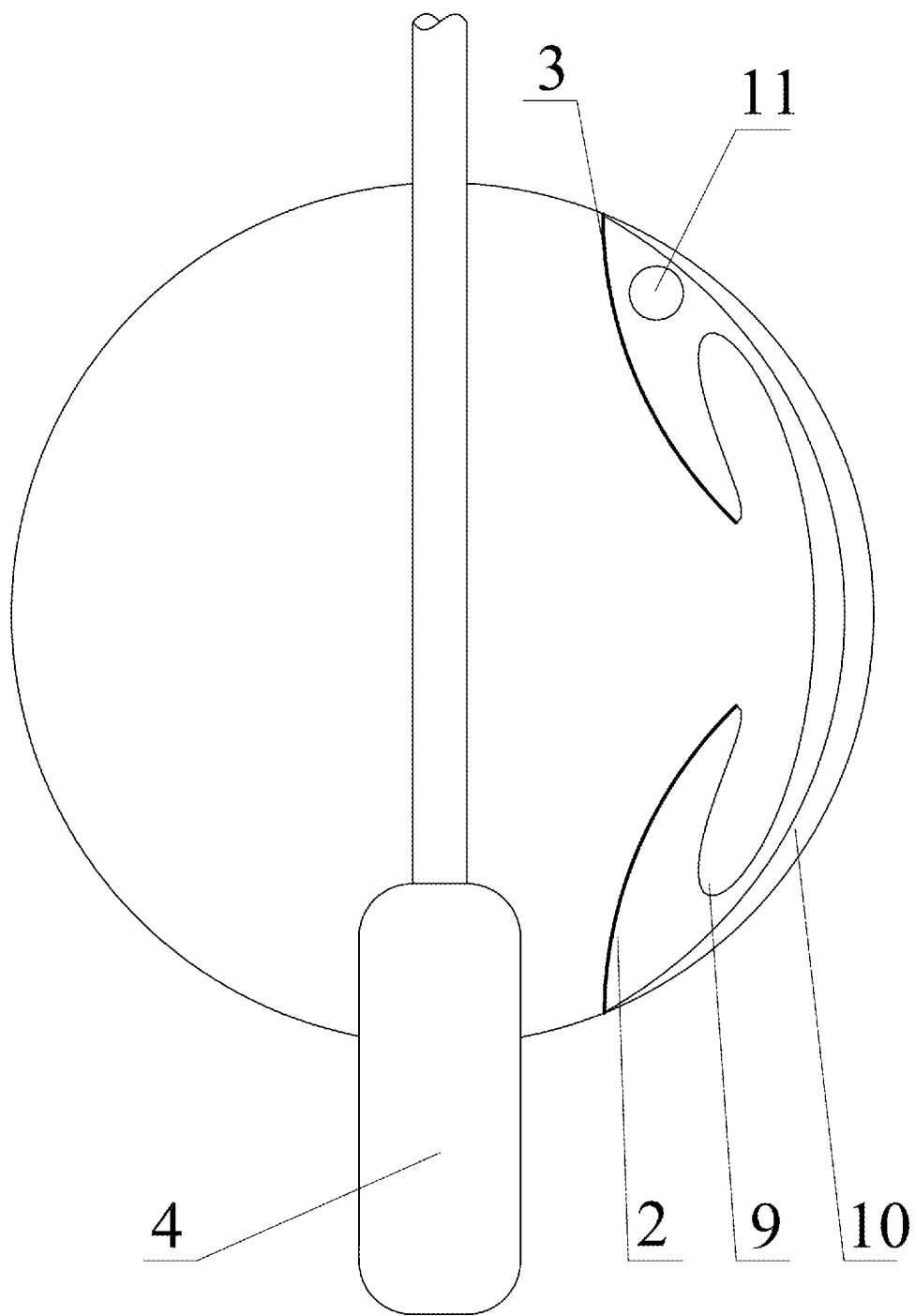
FIGS. 1-5 are a set of schematic views of one embodiment of an air-launched carrier rocket of the present invention of which the length is not limited by the front undercarriage of the carrier aircraft.
Figure 2:
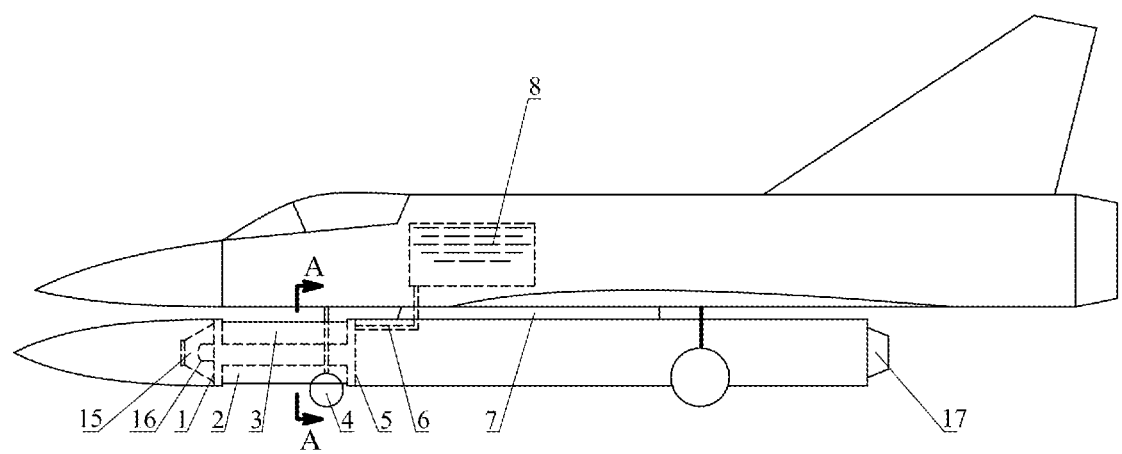
Figure 3:
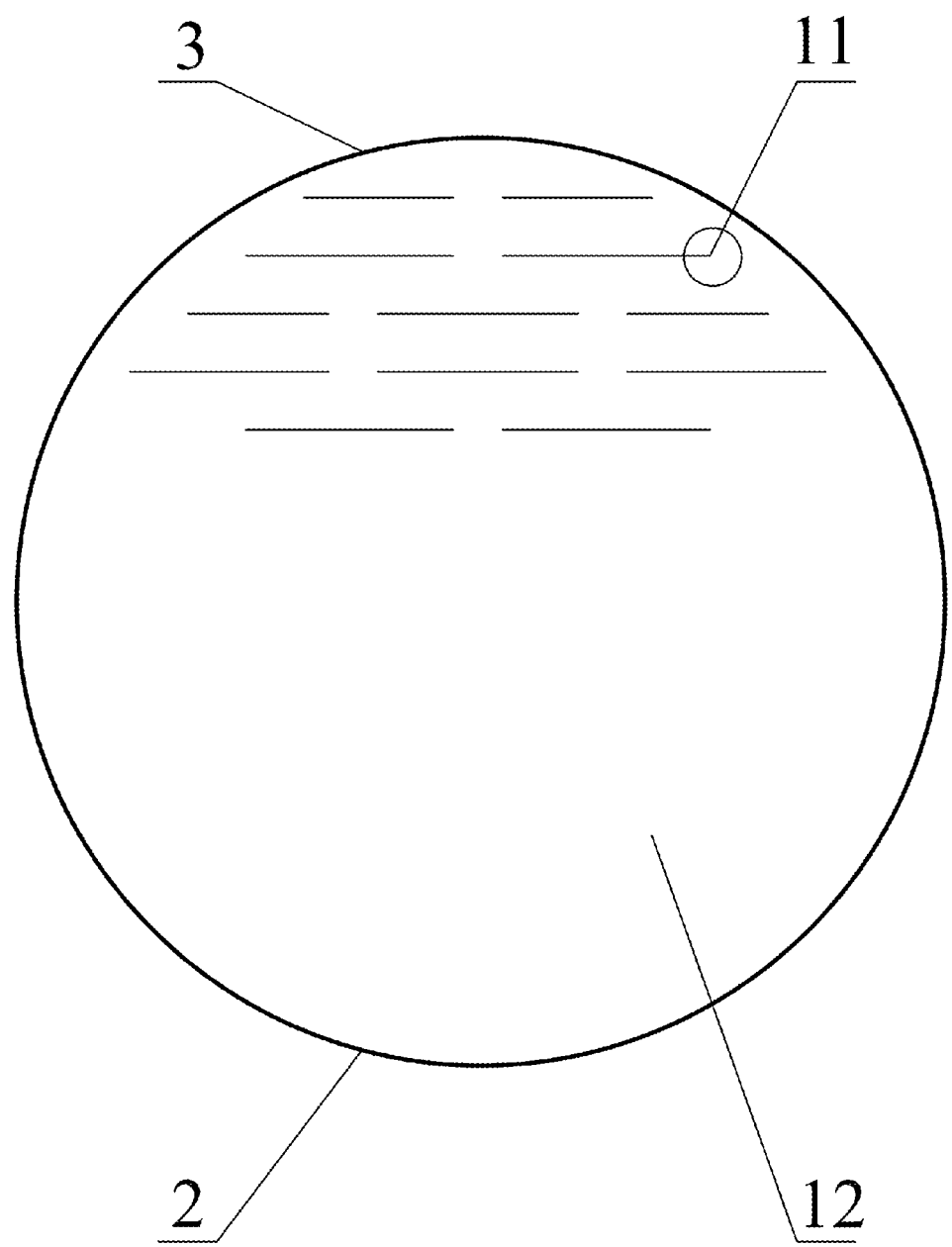
Figure 4:
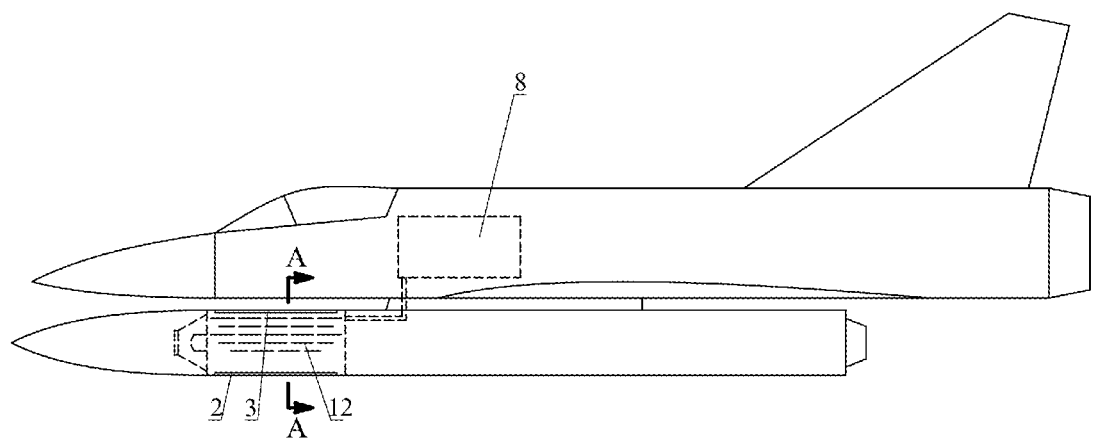
Figure 5:
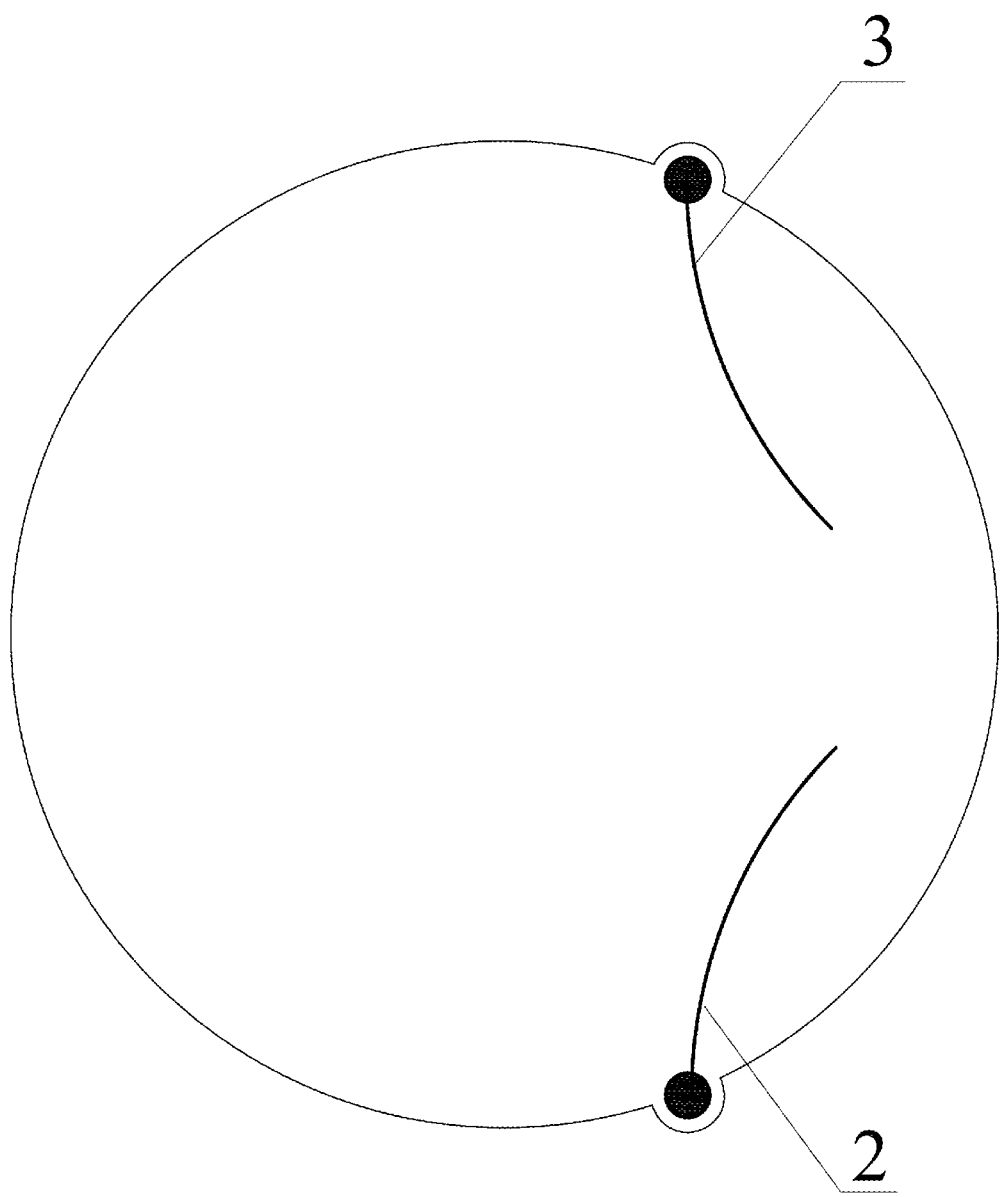

FIGS. 1, 2 and 5 show the carrier aircraft and the rocket body when they are stationary on the ground or in take-off run. FIG. 2 is a side view of the carrier aircraft and the rocket body when the ground is stationary or slid, and FIG. 1 is a cross-sectional view taken along line A-A of FIG. 2. In FIGS. 1 and 2, reference numerals 3 and 2 are upper cover and lower cover which are opened to the inside of the rocket body, respectively, reference numeral 4 is the front undercarriage of the carrier aircraft (since this component is not essential in the present invention, it is only schematically shown), reference numerals 1 and 5 are the front and rear panels of the storage tank of the rocket body, reference numeral 6 is the infusion pipeline, reference numeral 7 is the center pylon of the carrier aircraft, reference numeral 8 is the liquid-filled internal storage tank within the carrier aircraft, and reference numeral 11 is the outlet of the infusion pipeline on the rear wall of the storage tank of the rocket body. Reference numeral 9 is a soft tank diaphragm glued to the upper cover and lower cover, and reference numeral 10 is another diaphragm of the soft oil tank. This design makes the soft oil tank automatically unfold when the upper cover and lower cover are closed. FIG. 5 is a schematic diagram showing the movement of the configuration, where reference numerals 3 and 2 are the upper cover and lower cover respectively opened to the inside of the rocket body. FIGS. 3 and 4 show the carrier aircraft and the rocket body during flying. FIG. 4 is a side view of the carrier aircraft and the rocket body during flying, and FIG. 3 is a cross-sectional view taken along line A-A of FIG. 4. In FIGS. 3 and 4, reference numerals 3 and 2 are closed upper and lower covers, reference numerals 11 is the outlet of the infusion pipe on the rear wall of the storage tank of the rocket body, reference numerals 8 is the empty internal storage tank of the carrier body, and reference numerals 12 is the full internal storage tank of the carrier body.

Figure 6:
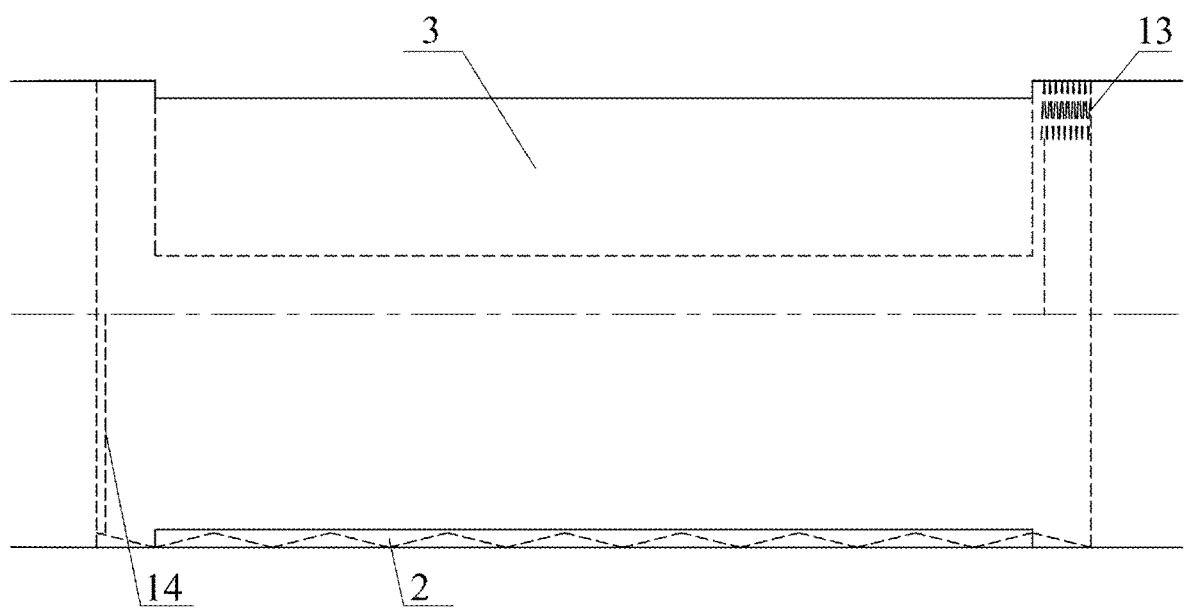
FIG. 6 is a schematic illustration of another embodiment of another air-launched carrier rocket of the present invention of which the length is not limited by the front undercarriage of the carrier aircraft.

The air-launched carrier rocket shown in FIG. 6 of which the length is not limited by the front undercarriage of the carrier aircraft is another embodiment of the present invention. FIG. 6 depicts, in a top-to-bottom contrast, a part of rocket body and the storage tank of the rocket body that are in two states of stationary or running and flying. The only difference from the previous embodiment is that the soft oil tank is not glued to the upper cover and lower cover, and the soft oil tank is a separate axially telescopic cylindrical soft oil tank. The upper half of FIG. 6 corresponds to the state in which the carrier aircraft and the rocket body are stationary or running on the ground, where reference numeral 3 is the upper cover that opens inward, and reference numeral 13 is a cylindrical soft oil tank that is in an axially contracted state. The annular edge of the bottom of the cylindrical soft oil tank is glued to the rear wall of the storage tank of the rocket body, and the side wall of the cylindrical soft tank is in a wrinkle-contracted state without internal pressure. The lower half of FIG. 6 corresponds to the state in which the carrier aircraft and the rocket body are flying, where reference numeral 2 is the lower cover that is closed downwardly, and reference numeral 14 is a cylindrical soft oil tank that is in an axially extended state. The compressed soft oil tank can be opened by the liquid poured in.

Of course, the air-launched carrier rocket of which the length is not limited by the front undercarriage of the carrier body can also adopt other structures, such as a soft oil tank, in which the lining is removed, and which completely depends on the sealing strip at the edges of the upper cover and lower cover to achieve the sealing of the storage tank. Such variations also fall within the protection scope of the present invention.

Figure 7:
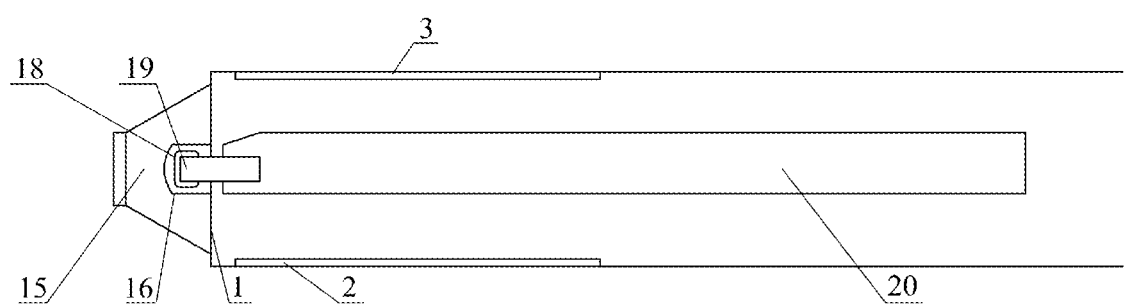
FIG. 7 is a schematic view of a rocket with two rotors when the fairing and load have been disengaged and the load adapter has not been disengaged.

FIG. 7 shows another embodiment of the non-legged reusable air-launched carrier rocket which includes stack-shaped concave notches (16) arranged at a tail of a load adapter (15); the number of the notches is equal to the number of rotor blades (20); radially extending short branch arms (18) connect a paddle and a flapping hinge (19) and are able to pass each of the notches; the load adapter and the rocket body are then separated after a load is separated from the load adapter.

What is claimed is:

1. A system for a non-legged reusable air-launched carrier rocket comprising:
   a carrier aircraft having a center pylon for attaching the carrier rocket, a liquid tank for holding fuel, oxidant, or elemental propellant, the liquid tank in fluid communication with a pipe, and a front undercarriage configured to be in a lowered position and a retracted position;
   the carrier rocket having a rocket head with an expandable rotor, a rocket body having two elongated openings spaced opposite to each other, each opening having a cover configured to open into the rocket body to form a passage through the rocket, the passage containing a storage tank being defined by a front panel, rear panel, and a soft tank diaphragm, each cover configured to be streamliner with an outer surface of the carrier rocket when in a closed position, and the carrier rocket having a tail with a plug nozzle having a convex spherical surface; and
   a platform configured to provide a cushioning effect and having a top surface with a concave spherical shape matching the convex spherical surface of the plug nozzle;
   wherein the carrier rocket is configured to be attached to the center pylon such that when each cover is open the front undercarriage can extend through the passage when moving between the lowered and retracted position, wherein the pipe has an exit on the rear panel configured to fill the soft tank diaphragm with fuel, oxidant, or elemental propellant from the liquid tank, and wherein the platform can be placed at a dropping point and bear the weight of the carrier rocket.

* * * * *